(12) United States Patent
Iwagami et al.

(10) Patent No.: US 7,467,036 B2
(45) Date of Patent: Dec. 16, 2008

(54) IN-VEHICLE ELECTRONIC CONTROL UNIT

(75) Inventors: Yuki Iwagami, Tokyo (JP); Junya Tanaka, Tokyo (JP); Manabu Yamashita, Tokyo (JP); Kohji Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 672 days.

(21) Appl. No.: 11/205,190

(22) Filed: Aug. 17, 2005

(65) Prior Publication Data
US 2006/0089756 A1  Apr. 27, 2006

(30) Foreign Application Priority Data
Oct. 26, 2004  (JP)  ............ P2004-311227

(51) Int. Cl.
G06F 7/00  (2006.01)
(52) U.S. Cl. .............. 701/36; 701/1; 710/1; 341/1; 341/126; 341/129; 700/1; 700/2; 700/19; 700/20
(58) Field of Classification Search ............. 701/1, 701/36; 341/1, 126, 129; 700/1, 2, 19, 20
See application file for complete search history.

(56) References Cited

U.S. PATENT DOCUMENTS

| 6,795,767 | B2 * | 9/2004 | Nakamoto et al. ........ 701/115 |
| 7,178,069 | B2 * | 2/2007 | Hashimoto et al. ........ 714/47 |
| 7,203,580 | B2 * | 4/2007 | Ban et al. ................ 701/29 |
| 2002/0035650 | A1 * | 3/2002 | Nakamoto et al. .......... 710/5 |
| 2002/0169524 | A1 | 11/2002 | Nakamoto et al. |
| 2003/0158649 | A1 * | 8/2003 | Hashimoto et al. ........ 701/114 |
| 2003/0216841 | A1 * | 11/2003 | Hashimoto et al. .......... 701/1 |
| 2005/0015160 | A1 | 1/2005 | Hashimoto et al. |
| 2005/0080529 | A1 * | 4/2005 | Hashimoto et al. ........ 701/36 |

FOREIGN PATENT DOCUMENTS

| DE | 10201849 A1 | 11/2002 |
| DE | 10243589 A1 | 9/2003 |
| DE | 102004012797 A1 | 2/2005 |
| JP | 8-23276 A | 1/1996 |
| JP | 2003-285702 A | 10/2003 |

* cited by examiner

*Primary Examiner*—Lynda Jasmin
*Assistant Examiner*—Nikhil Sriraman
(74) *Attorney, Agent, or Firm*—Sughrue Mion, PLLC

(57) ABSTRACT

A first control circuit portion carries out input/output control in cooperation with a microprocessor, a program memory, and a RAM memory. A second control circuit portion is in cooperation with the communication control circuit portion and the data memory to carry out serial communication with the first control circuit portion. A switch signal input to the second control circuit portion is stored in a first report packet, a digital conversion value for an analog signal input is stored in a second report packet, and the first and second packets are alternately periodically transmitted to the first control circuit portion. A multi-channel AD converter included in an analog signal input circuit starts to carry out AD conversion a prescribed time period after a first report packet is transmitted and finishes conversion before a second report packet is transmitted, so that up-to-date AD conversion data is transmitted.

11 Claims, 8 Drawing Sheets

IN-VEHICLE ELECTRONIC CONTROL UNIT

BACKGROUND OF THE INVENTION

1. Field of the Invention

The invention relates to an in-vehicle electronic control unit having first and second control circuit portions that are electrically separated and serially communicate monitoring signal and control signal to each other.

2. Description of the Related Art

There have been known in-vehicle electronic control unit including first and second control circuit portions that are electrically separated and serially communicate monitoring signal and control signal to each other, by using of periodic transmission packets for down link communication, periodic report packets for up link communication, and report return packets for up link communication corresponding to reading request packets as down link communication and the like.

The "in-vehicle electronic control unit" disclosed by Patent Document 1: Japanese Patent Laid-Open No. 2003-285702 (paragraph No. 0079, FIG. 2) for example includes a microprocessor connected with a key station serial-parallel converter to form a first control circuit portion, and a combined control circuit portion connected with a sub station serial-parallel converter that is serially connected to the key station serial-parallel converter to form a second control circuit portion. The combined control circuit portion includes first storing means for storing data transmitted from the key station to the sub station, distribution storing means for transferring command data stored in the first storing means to a device memory if the data is a writing/setting command, return packet producing means for producing up link return information to the microprocessor, second storing means for sequentially storing the return information to avoid a traffic jam and reading out the information in a first-in-first-out manner, and return packet organizing means for adding up-to-date information to the packet for return.

As for the return packet, at most 16 pieces of ON/OFF information or digital conversion values for at most 15 analog signals can periodically be returned based by return data 1 and 2. Which data to be returned is determined by an address specified in status data.

Meanwhile, the "analog/digital converter" as disclosed by Patent Document 2: Japanese Patent Laid-Open No. 8-23276 (Abstract, FIG. 1) includes (1) a multiplexer portion responsive to a selection instruction to select one channel among a plurality of channels to which analog signals are input, (2) an analog/digital conversion portion that converts the single analog signal selected by the multiplexer portion into a digital signal, and (3) a control portion that outputs a selection instruction to the multiplexer portion and reads the digital signal produced by the analog/signal conversion portion. Then, (4) the multiplexer portion includes a channel return portion that returns the selected channel to the control portion when the analog/digital conversion portion finishes conversion operation, (5) the control portion includes an abnormality determining portion that determines an abnormality when the channel output by the control portion to the multiplexer portion does not match the channel returned from the channel return portion.

The analog/digital converter includes (6) a multiplexer portion responsive to a selection instruction to select a channel among a plurality of channels to which analog signals are input, (7) an analog/digital conversion portion that converts the single analog signal selected by the multiplexer portion into a digital signal, (8) a control portion that outputs a selection instruction to the multiplexer portion and reads a digital signal produced by the analog/digital conversion portion, and (9) an abnormality determining portion that determines an abnormality when the time necessary for conversion, i.e., the time measured between the output of a conversion start instruction to the analog/digital conversion portion by the control portion and the end of the conversion by the analog/digital conversion portion is not less than predetermined maximum time.

The "in-vehicle electronic control unit" disclosed by Patent Document 1 can alternately and periodically return ON/OFF information as switch signal inputs and digital information as digital conversion values based on analog input signals, but AD conversion must be carried out at frequency sufficiently higher than the cycle of periodic returning in order to obtain digital information as new as possible, which increases the control load on the second control circuit portion.

In the "analog/digital converter" disclosed by Patent Document 2, a channel specifying instruction must be transmitted in advance every time digital information for an analog signal is to be obtained, and the communication control load is high in order to obtain many digital values at high frequency.

In addition, abnormality determination about the AD converter is carried out after the AD converted-digital information is transmitted, and therefore abnormality determination may be late or transmission may be wasted.

SUMMARY OF THE INVENTION

The present invention is directed to a solution to the above described disadvantages, and it is an object of the invention to provide an in-vehicle electronic control unit that can transmit digital conversion values based on many analog signals efficiently and highly frequently from the second control circuit portion to the first control circuit portion while alleviating the control load.

In an in-vehicle electronic control unit according to the invention, a first control circuit portion includes a program memory having input/output control means and communication control means, a RAM memory for operation processing, a microprocessor in cooperation with the program memory, and a first serial-parallel converter. A second control circuit portion includes a communication control circuit portion for communicating at least monitoring signals and control signals, a switch signal input circuit, an analog signal input circuit including a multi-channel AD converter, a data memory, and a second serial-parallel converter. The first and second control circuit portions serially communicate the monitoring signals and the control signals to each other through the first and second serial-parallel converters.

The first control circuit portion further includes periodic transmission means, periodic report permission means, and AD conversion permission means.

The periodic transmission means serves as writing setting means for periodically transmitting control output data and constant setting data from the first control circuit portion to the second control portion and stores the control output data and the constant setting data in the data memory in the second control circuit portion.

The periodic report permission means serves as writing setting means for storing first instruction data to permit the second control circuit portion to transmit the periodic report. The first instruction data is transmitted by the periodic transmission means to a prescribed address portion of the data memory provided in the second control circuit portion.

The AD conversion permission means serves as writing setting means for storing second instruction data to permit the second control circuit portion to issue an AD conversion start instruction to the multi-channel AD converter. The second instruction data is transmitted by the periodic transmission means to a prescribed address portion of the data memory in the second control circuit portion.

The second control circuit portion further includes periodic reporting means, report sequence selecting means, and AD conversion timing specifying means.

The periodic reporting means serves as input reading means used for periodically reporting periodic report data including monitoring input data and status information from the second control circuit portion to the first control circuit portion and used for allowing the first control circuit portion to store the periodic report data in the RAM memory.

The report sequence selecting means serves as selecting control means for sequentially selecting a first report packet that reports a batch of a plurality of ON/OFF information inputted from the switch signal input circuit, and a second report packet that reports digital information for a prescribed number of channels produced by digital conversion by the multi-channel AD converter, and carrying out periodic report using the periodic reporting means so that the first report packet is given priority and at least the second report packets are not successive.

The AD conversion timing specifying means serves as conversion control means for generating an AD conversion start instruction to the multi-channel AD converter after the second control circuit portion receives instructions for periodic report permission and AD conversion permission by the periodic report permission means and the AD conversion permission means and after the first report packet is transmitted, and specifying AD conversion start timing so that a series of AD conversion operation by the multi-channel AD converter is complete before the timing of transmitting the next second report packet.

By the in-vehicle electronic control unit according to the invention, periodic reporting is prohibited at the start of engine operation, various kinds of constant setting are carried out intensively by the periodic transmission means, and thus periodic reporting is permitted after the initialization is complete, so that the control circuit portions carry out input monitoring by periodic reporting and output control by periodic reporting to each other. In this way, the microprocessor provided in the first control circuit portion can permit or stop AD conversion to the multi-channel AD converter provided in the second control circuit portion.

The second control circuit portion can generate an AD conversion start instruction in synchronization with the first report packet when AD conversion is permitted.

Therefore, immediately before a second report packet including a digital conversion value for an analog signal as transmission data is transmitted, AD conversion has been carried out and up-to-date AD conversion information can be reported.

If periodic reporting is permitted, AD conversion operation can be carried out/stopped, so that AD conversion operation at frequency higher than necessary can be reduced, and the control load on the second control circuit portion can be alleviated.

DETAILED DESCRIPTION OF THE PREFERRED EMBODIMENTS

First Embodiment

Now, the configuration of a first embodiment of the invention will be described in conjunction with FIG. 1.

Figure 1:
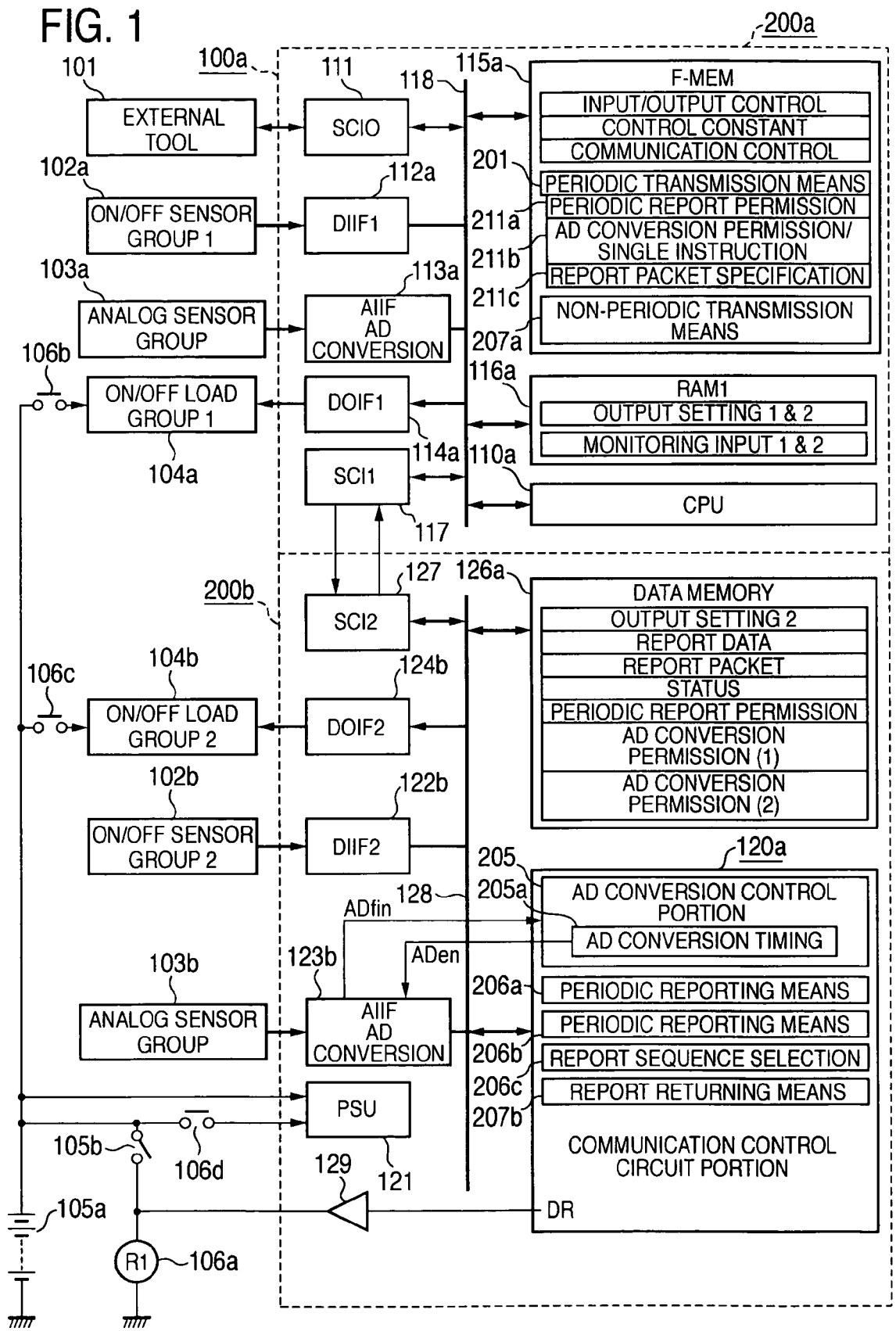
FIG. 1 is a block diagram of the configuration of an in-vehicle electronic control unit according to a first embodiment of the invention.

FIG. 1 is a block diagram of the configuration of an in-vehicle electronic control unit according to the first embodiment of the invention.

In FIG. 1, the in-vehicle electronic control unit 100a includes a first control circuit portion 200a and a second control circuit portion 200b.

Firstly, elements connected to the outside of the in-vehicle electronic control unit 100a will be described.

An external tool 101 is connected to the in-vehicle electronic control unit 100a through a detachable connector to transfer and write control programs and control constants in a non-volatile program memory 115a (that will be described) when the product is shipped or inspected for maintenance purposes.

A first input sensor group 102a carries out ON/OFF operations at relatively high speed and high frequency and signals therefrom must directly be obtained by a microprocessor 110a (that will be described). A second input sensor group 102b turns ON/OFF at relatively low frequency, and delay in obtaining the signals is not much a problem.

A first analog sensor group 103a outputs relatively greatly changing signals that must directly be obtained by the microprocessor 110a. A second analog sensor group 103b outputs relatively mildly changing signals and delay in obtaining the signals is not much a problem.

A first electric load group 104a carries out ON/OFF operation at relatively high frequency, and the driving output must be generated without delay. A second electric load group 104b carries out ON/OFF operation at relatively low frequency, and delay in the driving output response is not much of a problem.

An external power supply 105a is an in-vehicle battery that supplies power to the in-vehicle electronic control unit 100a and the first and second electric load groups 104a and 104b. A power supply switch 105b drives a power supply relay 106a, the power supply circuit to the first and second electric load groups 104a and 104b is closed by output contacts 106b and 106*c* of the power supply relay 106*a*, and the power feed circuit to the in-vehicle control unit 100*a* is closed by an output contact 106*d*.

Note that the in-vehicle electronic control unit 100*a* is subjected to sleep power feeding for backing up the RAM memory while the power supply switch 105*b* is open.

The configuration of the first control circuit portion 200*a* will be described.

The microprocessor 110*a* is for example a 32-bit microprocessor and serves as a main part in input/output control in the in-vehicle electronic control unit 100*a*. The microprocessor 110*a* communicates with the external tool 101 through a serial interface 111 during shipment adjustment or maintenance checking.

A switch signal input circuit 112*a* is a direct input signal interface circuit connected in parallel with the first input sensor group 102*a*. An analog signal input circuit 113*a* is a direct analog input interface including a multi-channel AD converter and connected in parallel with the first analog sensor group 103*a*. The output circuit 114*a* is a direct output signal interface circuit made of transistors or the like connected parallel to the first electric load group 104*a*. The program memory 115*a* is a non-volatile memory such as a flash memory. The RAM memory 116*a* is a non-volatile memory for operation processing. A first serial-parallel converter 117 is paired with a second serial-parallel converter 127 (that will be described) and is a serial communication circuit to serve as a key station to the second serial-parallel converter 127.

Note that the serial interface 111, the first serial-parallel converter 117, the switch signal input circuit (direct input signal interface circuit) 112*a*, the multi-channel AD converter 113*a*, the output circuit (direct output signal interface circuit) 114*a*, the program memory 115*a*, the RAM memory 116*a* and the microprocessor 110*a* are connected with one another through a data bus 118, and any of them selected by an address bus or a select circuit (that is not shown) communicates with the microprocessor 110*a*.

Figure 2:
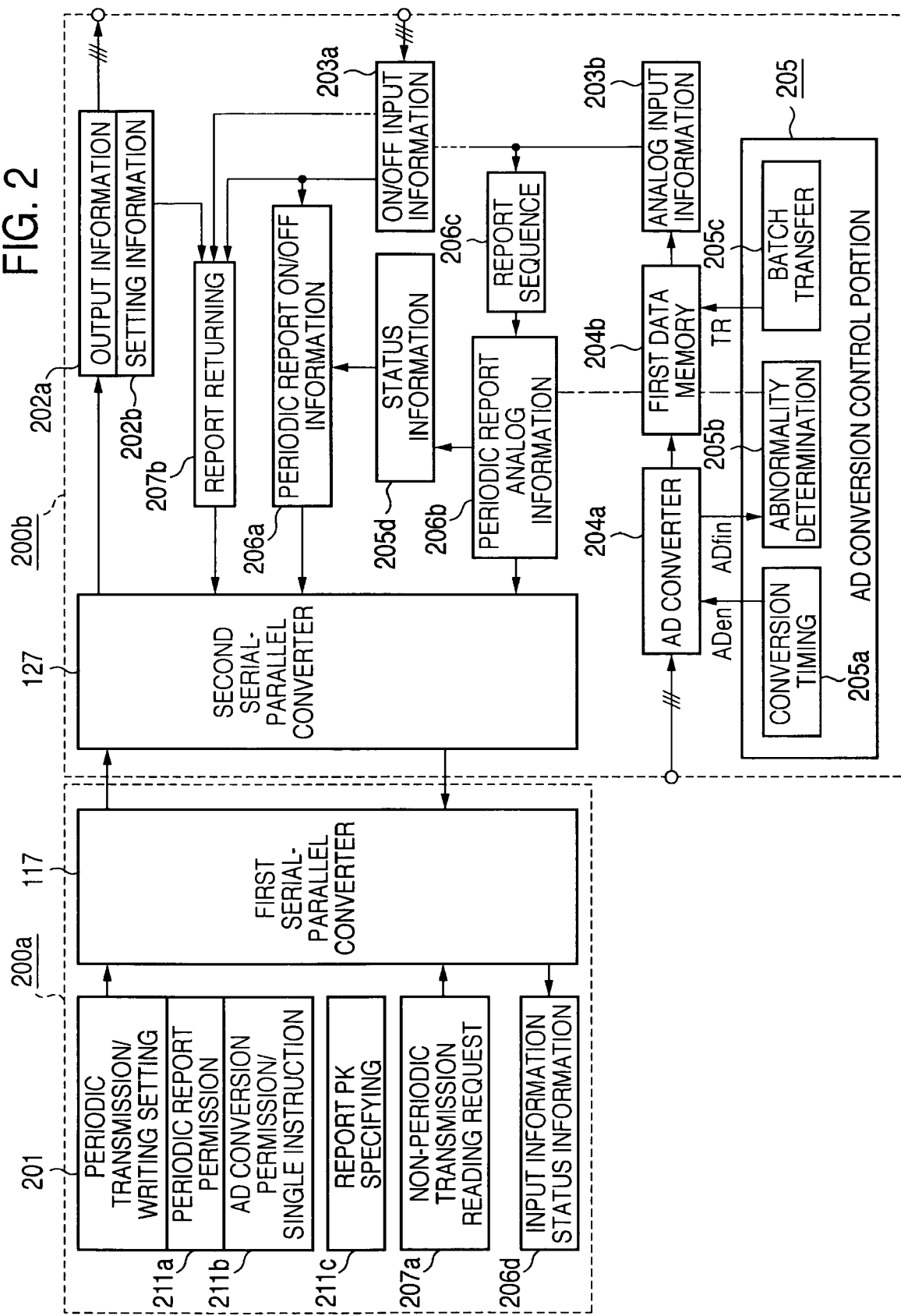
FIG. 2 is a block diagram for use in illustration of communication control by the in-vehicle electronic control unit according to the first embodiment.

The program memory 115*a* is written with programs serving as input/output control means, programs serving as communication control means, or programs serving as various control means as shown in FIG. 2. More specifically, programs serving as periodic transmission means 201, periodic report permission means 211*a*, AD conversion permission means 211*b*, report packet specifying means 211*c*, and non-periodic transmission means 207*a* are written.

Output setting data for the first and second electric load groups 104*a* and 104*b* or input signals from the first input sensor group 102*a* or the first analog sensor group 103*a*, and monitoring input data such as indirect input information and status information reported from the second control circuit portion 200*b* (that will be described later) are written in the RAM memory 116*a*.

Now, the configuration of the second control circuit portion 200*b* will be described.

The communication control circuit portion 120*a* includes an AD conversion control portion 205 (that will be described) and the communication control circuit portion 120*a* is a logic circuit that carries out communication control to the first control circuit portion 200*a* in cooperation with the data memory 126*a*.

The switch signal input circuit 122*b* is an indirect input signal interface circuit connected in parallel with the second input sensor group 102*b*. The analog signal input circuit 123*b* includes a multi-channel AD converter and the analog signal input circuit 123*b* is an indirect analog input interface circuit connected with the second analog sensor group 103*b*. An output circuit 124*b* is an indirect output signal interface circuit made of for example a power transistors connected in parallel with the second electric load group 104*b*. The second serial-parallel converter 127 is a serial communication circuit that serves as a sub station.

Note that the first and second serial-parallel converters 117 and 127 are serially connected with each other, so that control signals transmitted from the key station to the sub station and monitoring signals reported from the sub station to the key station can be exchanged.

The second serial-parallel converter 127, the switch signal input circuit (indirect input signal interface circuit) 122*b*, the output circuit (indirect output signal interface circuit) 124*b*, the multi-channel AD converter 123*b*, the data memory 126*a*, and the communication circuit portion 120*a* are connected with each other through a data bus 128.

Furthermore, various kinds of setting data transmitted from the microprocessor 110*a*, output setting data for the second electric load group 104*b*, or monitoring input signals for reporting to the microprocessor 110*a* from the second input sensor group 102*b* and the second analog sensor group 103*b*, and status information related to the second control circuit portion 200*b* are written in the data memory 126*a*.

The power supply unit 121 is directly supplied with power from the external power supply 105*a* or through the output contact 106*d* of the power supply relay 106*a* and generates a stabilizing control power supply output for use in the in-vehicle electronic control unit 100*a*.

The communication control circuit 120*a* generates a power supply relay driving output DR in response to an instruction from the microprocessor 110*a*, and carries out self-holding driving to the power supply relay 106*a* through a driving element 129. The circuit portion includes an AD conversion control portion 205 having AD conversion timing specifying means 205*a*, periodic reporting means 206*a* and 206*b*, report sequence selecting means 206*c*, and report returning means 207*b*.

In the in-vehicle electronic control unit 100*a* described above, the monitoring input signals for input/output control are inputted from the first input sensor group 102*a* and the first analog sensor group 103*a* directly connected to the microprocessor 110*a* through a bus and from the second input sensor group 102*b* and the second analog sensor group 103*b* indirectly connected to the microprocessor 110*a* through a bus via the first and second serial-parallel converters 117 and 127.

The microprocessor 110*a* generates control output signals based on the state of these monitoring input signals, the control programs stored in the program memory 115*a* and the control constants.

The first electric load group 104*a* directly connected to the microprocessor 110*a* through a bus and the second electric load group 104*b* indirectly connected to the microprocessor 110*a* through a bus via the first and second serial-parallel converters 117 and 127 are driven by the control output signals from the microprocessor 110*a*.

Note that the control programs and the control constants are transferred to and stored in the program memory 115*a* in advance from the external tool 101 before the start of the operation of the in-vehicle electronic control unit 100*a*. When the in-vehicle electronic control unit 100*a* starts to operate, a part of the control constants stored in the program memory 115*a* is transferred to the data memory 126*a*.

Now, the communication control in the in-vehicle electronic control unit shown in FIG. 1 will be described in conjunction with FIG. 2.

FIG. 2 is a block diagram for use in illustration of communication control by the in-vehicle control unit according to a first embodiment of the invention.

In FIG. 2, signals exchanged between the first control circuit portion 200a (hereinafter referred to as "key station") having the first serial-parallel converter 117 and the second control circuit 200b (hereinafter referred to as "sub station") having the second serial-parallel converter 127 are roughly categorized into the following kinds.

A periodic transmission packet 201I is prepared by periodic transmission means 201 in the key station and transmitted from the key station to the sub station. The periodic transmission packet is transmitted automatically from the key station substantially periodically without a request from the sub station, and the upper limit for the time interval is controlled to be a prescribed value or less.

Note that data transmitted in the periodic transmission packet 201I includes output information output to the second electric load group 104b through the data memory 126a and various kinds of setting constants written in the data memory 126a, and the details of the packet structure will be described in conjunction with FIG. 3.

An output information storing block 202a and a setting information storing block 202b in the sub station write the output information and the setting information transmitted in the periodic transmission packet 201I from the key station at a prescribed address portion of the data memory 126a, and the writing address at the time is specified in the periodic transmission packet 201I.

An ON/OFF input information reading block 203a in the sub station reads out for example a batch of 16 pieces of ON/OFF about the second input sensor group 102b stored in the data memory 126a from the switch signal input circuit 122b and reports the information in a periodic report packet 206aa (that will be described) to the first control circuit portion 200a.

An analog information reading block 203b in the sub station is used to report information stored in the second data memory as the second region of the data memory 126a in a periodic report packet 206bb that will be described to the first control circuit portion 200a.

Note that multi-channel AD conversion information generated by the multi-channel AD converter 204a included in the analog signal input circuit (indirect analog input interface circuit) 123b is provisionally stored in the first data memory 204b as the first region of the data memory 126a, determined for the absence of abnormality, and then transferred to the second data memory as a batch, and the analog input information reading block 203b reads out the content of the second data memory for example by two channels at a time and reports it to the first control circuit portion 200a in a periodic report packet 206bb.

The AD conversion control portion 205 includes AD conversion timing specifying means 205a that supplies an AD conversion start instruction ADen to the multi-channel AD converter 204a, abnormality determining means 205b (that will be described in connection with FIG. 7), and batch transfer means 205c. If the result of determination by the abnormality determination means 205b indicates normality, the multi-channel AD conversion values stored in the first data memory 204b are transferred as a batch to the second data memory, and the content of the second data memory is read out by the analog input information reading block 203b and reported to the first control circuit portion 200a by a periodic report packet 206bb.

If the result of determination by the abnormality determining means 205b indicates abnormality, a prescribed abnormality code number is written in status information 205d, and periodic reporting is carried out by a periodic report packet 206aa.

The periodic report packet 206aa is used to periodically transmit input information on the sub station side read out by the ON/OFF input information reading block 203a and the status information 205d to the key station by the periodic reporting means 206a.

The periodic report packet 206bb is used to periodically transmit input information on the sub station side read out by the analog input information reading block 203b to the key station by the periodic reporting means 206b.

The report sequence specifying block 206c is a control block to sequentially update and specify a channel number reported by the periodic report packet 206bb.

Note that the periodic report packets 206aa and 206bb are alternately transmitted substantially periodically and automatically from the sub station side even without a request from the key station, and the upper limit for the time interval is controlled to be a prescribed value or less.

A report information storing block 206d is means for transferring monitoring information reported in the periodic report packets 206aa and 206bb for writing at a prescribed address in the RAM memory 116a.

A non-periodic transmission packet 207aa is transmitted from the key station to the sub station when the key station issues a reading request to the sub station. A report return packet 207bb is returned from the sub station to the key station, and an address in the data memory 126a to which the report is returned is specified in the non-periodic transmission packet 207aa.

A periodic transmission packet 211aa serving as periodic report permission means, a periodic transmission packet 211bb as AD conversion permission means, and a periodic transmission packet 211cc as report packet specifying means are all a kind of periodic transmission packet 201I, and their contents will be detailed in connection with FIG. 3.

Now, the communication packets will be described in connection with FIG. 3.

Figure 3:
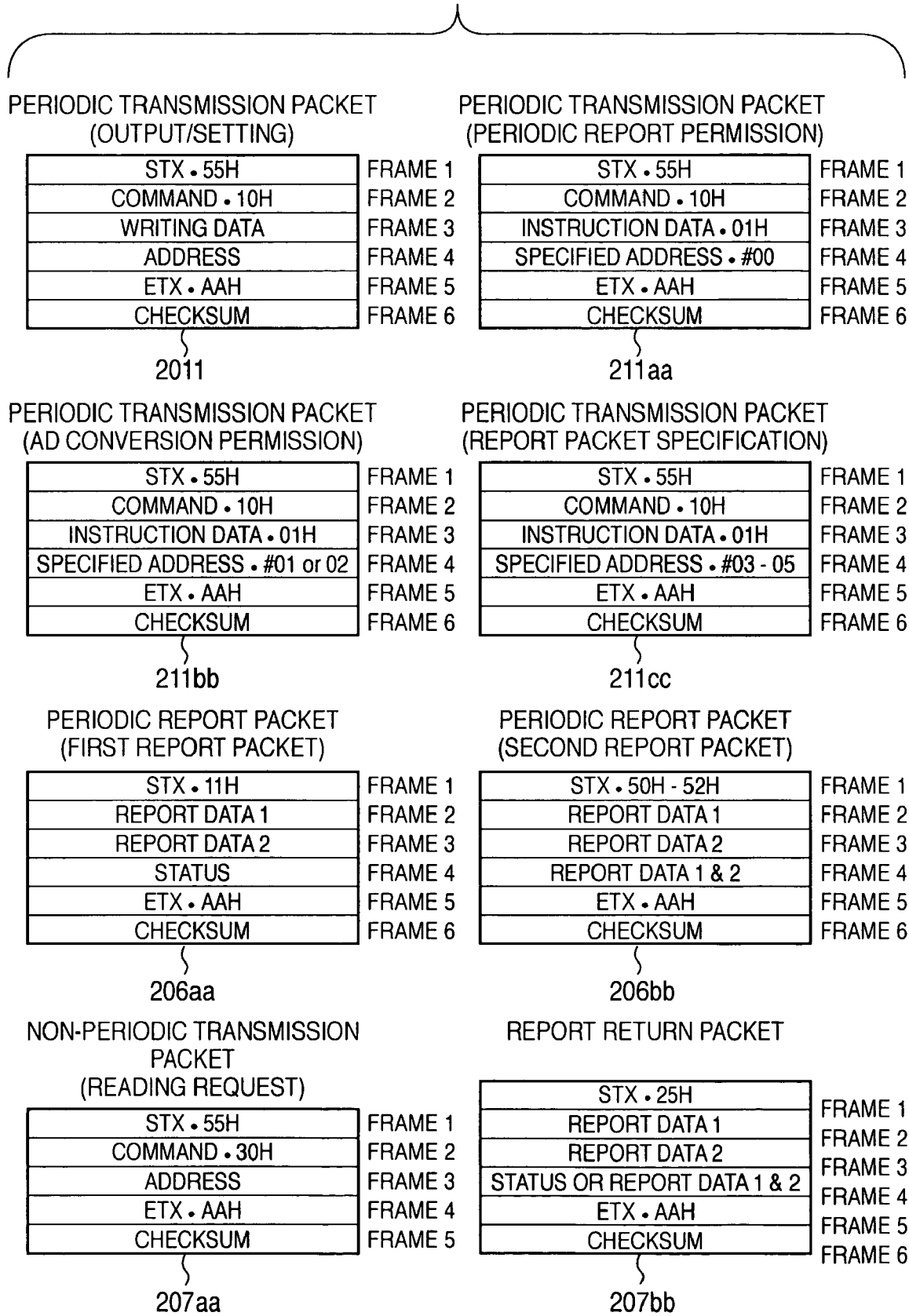
FIG. 3 shows communication packets in the in-vehicle electronic control unit according to the first embodiment.

FIG. 3 shows communication packets in the in-vehicle electronic control unit according to the first embodiment of the invention.

In FIG. 3, the periodic transmission packet 201I is periodically transmitted from the key station to the sub station by the periodic transmission means 201 and is made of frames 1 to 6 for start data 55H, a command 10H, writing data, a storage address, end data AAH, and checksum data.

Note that the H indicates that the value is represented by a hexadecimal number system, and the checksum data in the frame 6 in the periodic transmission packet 201I is a binary sum value of the data from the frames 1 to 5.

The periodic transmission packet 211aa generated by the periodic report permission means 211a includes permission information for periodic reporting as instruction data, and is made of six frames for start data 55H, a command 10H, instruction data 01H, specifying address #00, end data AAH, and checksum data. The periodic reporting is permitted by the instruction data 01H and prohibited by setting the instruction data to 00H.

The instruction data is stored at address #00 in the data memory 126a.

The periodic transmission packet 211bb generated by the AD conversion permission means 211b includes permission information for AD conversion as instruction data and is made of six frames for start data 55H, a command 10H, instruction data 01H, specifying address #01 or #02, end data AAH, and checksum data.

When the AD conversion permission instruction is written in the data memory 126a at address #01, AD conversion continues to be permitted based on the instruction data 01H, and when the instruction data is set to 00H, AD conversion is prohibited.

When the AD conversion permission instruction is written in the data memory 126a at address #02, AD conversion for one occasion is permitted based on the instruction data 01H, and if the instruction data is not set to 00H, the permission instruction is automatically deleted in the second control circuit portion 200b.

The periodic transmission packet 211cc generated by the report packet instruction means 211c includes as instruction data report permission information on a packet number basis for packets for periodic reporting, and is made of six frames for start data 55H, a command 10H, instruction data 01H, specifying addresses #03 to #05, end data AAH, and checksum data. Periodic reporting is permitted based on, the instruction data 01H, and when the instruction data is set to 00H, the periodic reporting is prohibited.

When the report permission instruction is written in the data memory 126a at address #03, report for digital conversion values for two analog input channels 1 and 2 is permitted or prohibited.

When the report permission instruction is written in the data memory 126a at address #04, reporting for digital conversion values for two analog input channels 3 and 4 is permitted or prohibited.

When the report permission instruction is written in the data memory 126a at address #05, reporting for digital conversion values for two analog input channels 5 and 6 is permitted or prohibited.

The periodic report packet 206aa (first report packet) generated by the periodic reporting means 206a is a communication packet for ON/OFF input information to the key station, and is made of six frames for start data 11H, report data 1, report data 1, status information, end data AAH, and checksum data.

A batch of 16 pieces of ON/OFF information is reported by the report data 1 and the report data 2.

The periodic report packet 206bb (second report packet) generated by the periodic reporting means 206b is a communication packet for analog input information to the key station, and is made of six frames for start data 50H to 52H, report data 1, report data 2, report data 1/2, end data AAH, and checksum data.

When the start data is 50H, digital conversion values for the analog input channels 1 and 2 are reported. When the start data is 51H, digital conversion values for the analog input channels 3 and 4 are reported. Meanwhile, when the start data is 52H, digital conversion values for the analog input channels 5 and 6 are reported.

The two reported analog signals are each converted into a 12-bit digital value. Eight bits in the frame 2 and the lower four bits in the frame 4, i.e., 12 bits in total are used to report one digital conversion value, and eight bits in the frame 3 and the higher four bits in the frame 4, i.e., 12 bits in total are used to report the other digital conversion values.

A non-periodic transmission packet 207aa transmitted by the non-periodic transmission means 207a is a communication packet used by the key station to request the sub station to read out data at a specified address. The non-periodic transmission packet 207aa is made of five frames for start data 55H, a command 30H, an address, end data AAH, and checksum data.

A report return packet 207bb generated by the report returning means 207b is a communication packet to be a report return for the data at the address requested for reading by the key station and is made of six frames for start data 25H, report data 1, report data 2, status or report data 1/2, end data AAH, and checksum data.

Note that when the address specified in the non-periodic transmission packet 207aa is for example 11H or any of 50H to 52H, the contents of the frames 2 to 4 in the report return packet 207bb are the same as those in the periodic report packets 206aa and 206bb.

In the foregoing, in the periodic report packets 206aa and 206bb or the report return packet 207bb, the address frame is omitted to reduce the number of frames and an address is identified in the start data STX frame, but when the number of ON/OFF input signals or the number of analog input signals to be reported is large, an address frame may be added to form a simple frame structure.

Now, the timing for periodic reporting from the second control circuit portion 200b will be described in connection with timing charts in FIG. 4.

Figure 4:
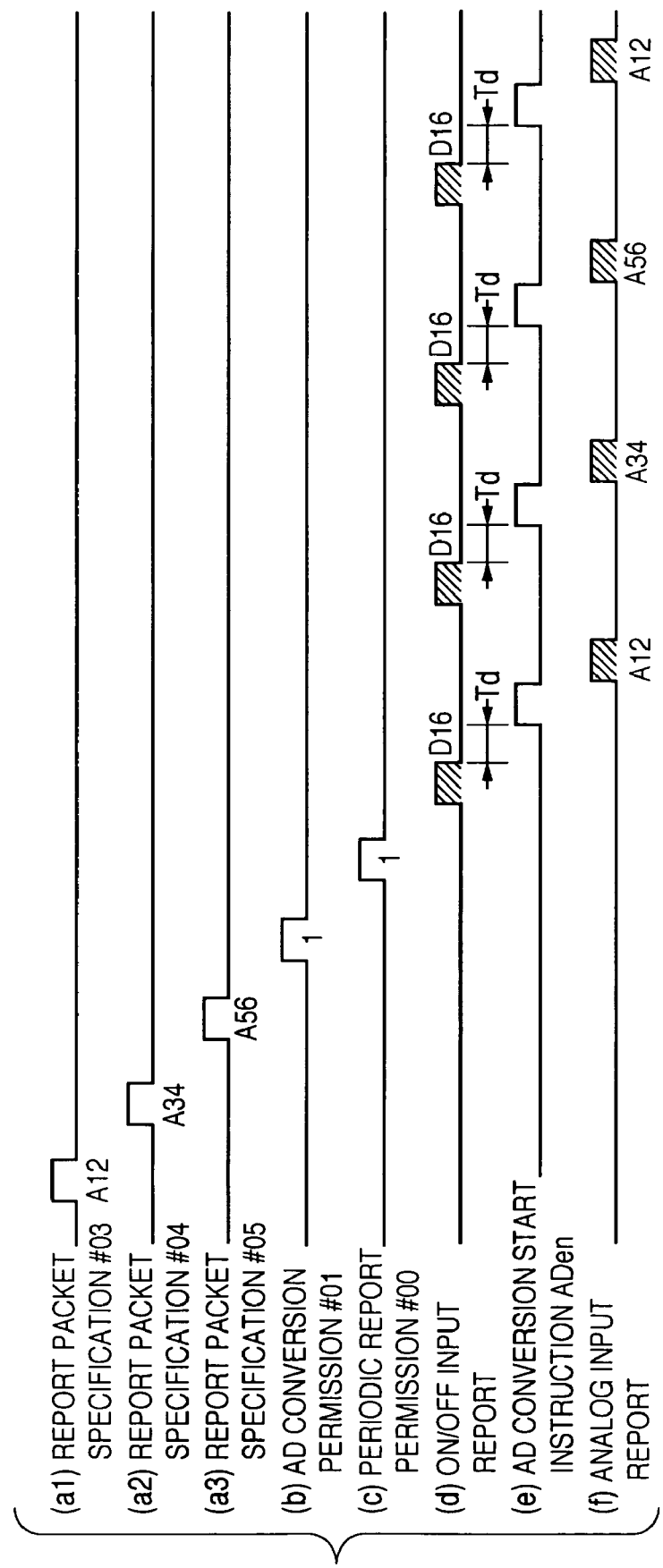
FIG. 4 is a timing chart for use in illustration of periodic reporting by the in-vehicle electronic control unit according to the first embodiment.

FIG. 4 includes timing charts for use in illustration of periodic report in the in-vehicle electronic control unit according to the first embodiment of the invention.

At (a1), (a2), and (a3) in FIG. 4, the timing charts show the timings for sequentially writing instruction data "01H" at addresses #03 to #05 in the data memory 126a to carry out periodic reporting of six pieces of analog input information for analog input channels A12, A34, and A56 by a periodic transmission packet 211cc by the report packet specifying means 211c.

At (b) in FIG. 4, the timing chart shows the timing for writing instruction data "01H" at address #01 in the data memory 126a by the periodic transmission packet 211bb by the AD conversion permission means 211b.

At (c) in FIG. 4, the timing chart shows the timing for writing instruction data "01H" at address #00 in the data memory 126a by the periodic transmission packet 211aa by the periodic report permission means 211a.

At (d) in FIG. 4, the timing chart shows the timing for carrying out periodic reporting of 16 pieces of ON/OFF information by a periodic report packet 206aa.

At (e) in FIG. 4, the timing chart shows the timing for the AD conversion timing specifying means 205a to generate an AD conversion start instruction ADen, and the AD conversion start instruction ADen is generated a time delay TD later after the periodic report packet 206aa is transmitted.

At (f) in FIG. 4, the timing chart shows the timing in which digital conversion values for six analog inputs from analog input channels A12, A34, and A56 in the periodic report packet 206 are sequentially and periodically reported. A report of an analog input with no report specification by the periodic transmission packet 211cc by the report packet specifying means 211c is omitted.

FIG. 4 includes timing charts for use in illustration of timings for data or packets used for periodic reporting. Subsequently to the periodic transmission packet 211bb indicating AD conversion permission at (b) in FIG. 4, the periodic transmission packet 211aa indicating the periodic report transmission at (c) is transmitted to the second control circuit 200b, and then the periodic report packet is transmitted from the second control portion 200b to the first control circuit portion 200a. The transmission timing for a periodic report packet 206aa for the ON/OFF input information at the time, and the transmission timing for an AD conversion start instruction and a periodic report packet 206bb for an analog input are as shown in FIG. 4 at (e) and (f). The periodic transmission packet 211cc that specifies a report packet is transmitted in timing earlier than (b) in FIG. 4.

Now, the timing for report returning from the second control circuit portion 200b will be described in connection with FIG. 5.

Figure 5:
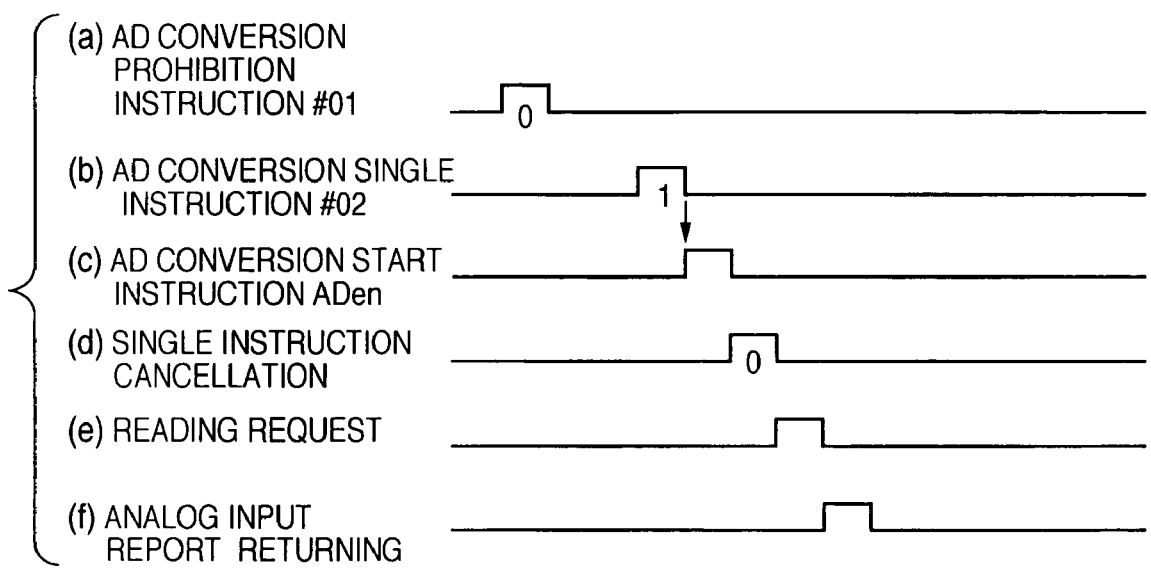
FIG. 5 is a timing chart for use in illustration of report returning in the in-vehicle electronic control unit according to the first embodiment.

FIG. 5 is a timing chart for use in illustration of report returning in the in-vehicle electronic control unit according to the first embodiment of the invention.

At (a) in FIG. 5, the timing chart shows the timing for writing instruction data "00H" at address #01 in the data memory 126a by a periodic transmission packet 211bb generated by the AD conversion permission means 211b.

At (b) in FIG. 5, the instruction data "01H" is written at address #02 in the data memory 126a by a periodic transmission packet 211bb generated by the AD conversion permission means 211b.

At (c) in FIG. 5, the timing chart shows the timing for the AD conversion timing specifying means 205a to generate an AD conversion start instruction ADen, which is generated as the instruction data "01H" is written in the data memory 126a at address #02.

At (d) in FIG. 5, the timing chart shows the timing in which the instruction data "00H" is written in the data memory 126a at address #02 in response to the generation of an AD conversion end signal ADfin by the multi-channel AD converter 204a and the AD conversion permission after the point is cancelled.

At (e) in FIG. 5, the timing chart shows the timing in which an input channel is specified by a non-periodic transmission packet 207aa generated by the non-periodic transmission means 207a and serving as a reading request, and a reading request for analog input information is carried out.

At (f) in FIG. 5, the timing chart shows the timing of reporting a digital conversion value for an analog input by a report return packet 207bb generated by the report returning means 207b. The input channel to be reported is specified in the non-periodic transmission packet 207aa.

FIG. 5 includes the timings for data and packets when a report is returned from the second control circuit portion 200b to the first control circuit portion 200a in response to the non-periodic transmission packet by the non-periodic transmission means. A reading request (transmission request) by the first control circuit portion 200a is for report returning for the analog input information, and in this case, the report is returned in the timing sequence of (a), (b), (c), (d), (e), and (f) in FIG. 5.

Now, the operation will be described.

Figure 6:
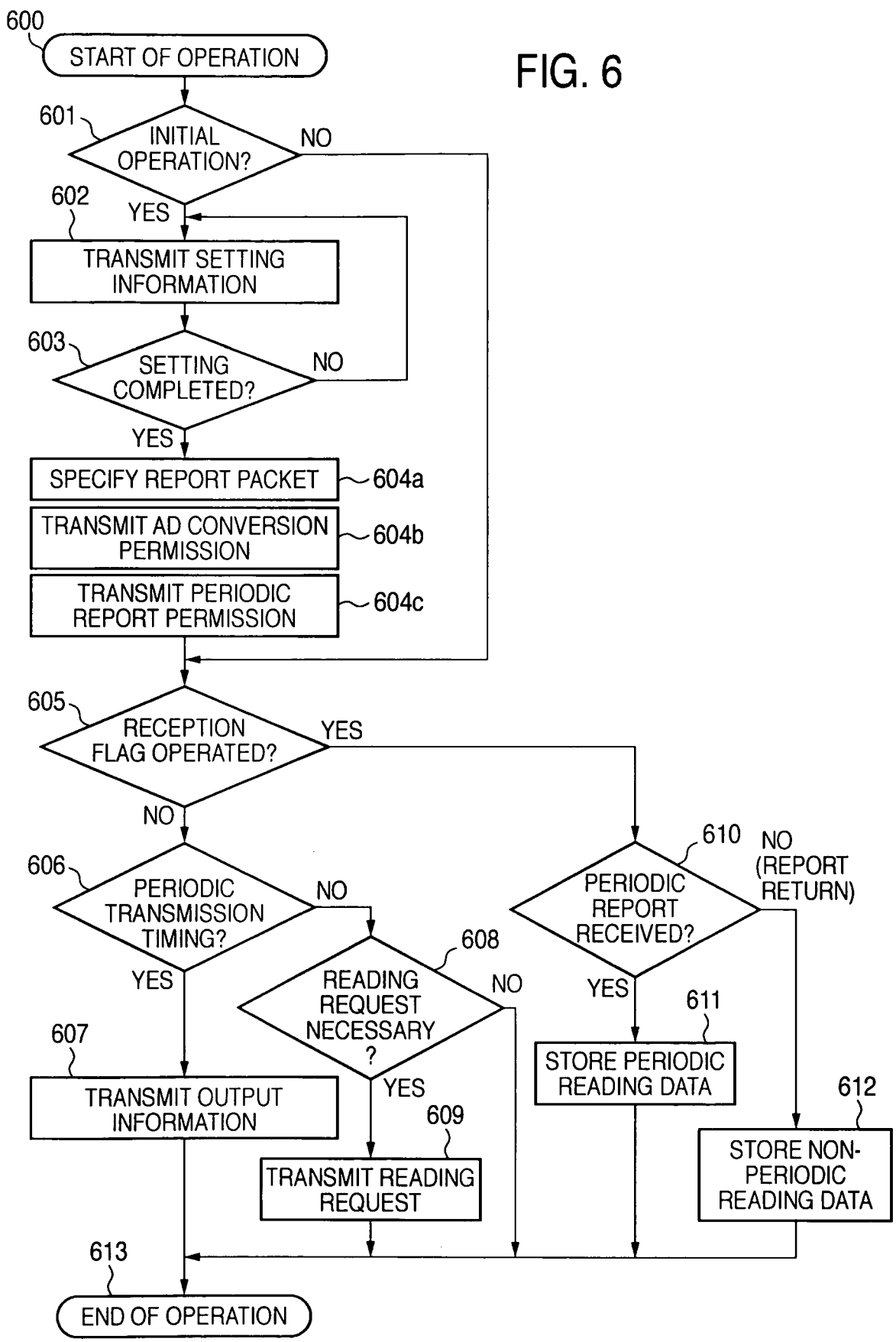
FIG. 6 is a flowchart for use in illustration of the communication control operation of a first control circuit portion in the in-vehicle electronic control unit according to the first embodiment.

FIG. 6 is a flowchart for use in illustration of the communication control operation of the first control circuit portion in the in-vehicle electronic control unit according to the first embodiment of the invention.

The communication control operation of the first control circuit portion 200a in FIG. 1 will be described in connection with FIG. 6.

In FIG. 6, in step 600, the microprocessor 110a starts the communication control operation and in the following step 601, the operation state of a flag (that is not shown) is determined to determine whether or not the operation is the initial operation after the power supply is turned on. If the result of determination in step 601 is YES, in other words, the operation is the initial operation, the process proceeds to step 602, and if it is not the initial operation, the process proceeds to step 605.

In step 602, the periodic transmission packet 2011 is transmitted by the periodic transmission means 201. In step 602, various control constants are transferred from the program memory 115a to the data memory 126a, and in the second control circuit portion 200b, the control constants are stored in the setting information storing block 202b.

In the following step 603, it is determined whether or not the transfer of the various control constants in step 602 has been completed. If it has not been completed, the process returns to step 602, and if it has been completed, the process proceeds to step 604a.

In step 604a, the report packet is specified by the report packet specifying means 211c, and in step 604a, the periodic transmission packet 211cc generated by the report packet specifying means 211c is transmitted to addresses #03 to #05 in the data memory 126a. In this step, instruction data to specify the packet to be reported among a plurality of the second report packets transmitted by the second control circuit portion 200b in the periodic report packet 206bb is stored.

Note that when there are a plurality of the report packets to be reported, periodic transmission packets 211cc are sequentially transmitted to addresses #03 to #05.

In the following step 604b, the AD conversion permission means 211b permits AD conversion, and in step 604b, the periodic transmission packet 211bb generated by the AD conversion permission means 211b is transmitted to the data memory 126a at address #01. In this step, instruction data for the AD conversion control portion 205 to permit the multi-channel AD converter 204a to issue an AD conversion start instruction ADen is stored.

In the following step 604c, the periodic report permission means 211a gives periodic report permission, and in this step 604c, the periodic transmission packet 211aa generated by the periodic report permission means 211a is transmitted to address #00 in the data memory 126a, so that instruction data to permit the second control circuit portion 200b to transmit periodic report packets 206aa to 206bb is stored.

In step 605 carried out if the result of determination in step 601 is NO, and it is not the initial operation, or subsequently to step 604c, the operation state of a receiving flag that operates when the first serial-parallel converter 117 receives report data from the second serial-parallel converter 127 is determined. If the result of determination in step 605 is not yet received, the process proceeds to step 606, and if the result has been received, the process proceeds to step 610.

In step 606, it is determined whether the periodic transmission timing is reached by determining whether it is the initial periodic transmission timing or a prescribed period has elapsed after the previous periodic transmission by measuring. If the result of determination in step 606 is YES, the process proceeds to step 607, and if the result is NO, the process proceeds to step 608.

In step 607, periodic transmission is carried out by the periodic transmission means 201, and in step 607, the control output signal stored as a result of operation by the microprocessor 110a in the RAM memory 116a is transmitted to the data memory 126a, and in the second control circuit portion 200b, the control output is stored by the output information storing block 202a to drive the second electric load 104b.

In step 608, it is determined whether a reading request must be carried out to the second control circuit portion 200b.

Step 609 is carried out by the non-periodic transmission means 207a if the result of determination in step 608 indicates YES and a reading request is necessary, and in step 609, a non-periodic transmission packet 207aa is transmitted.

Note that the non-periodic transmission means 207a in step 609 is adapted as the need arises in order to read and check monitoring input data at a specified address by the first control circuit portion 200a to the second control circuit portion 200b and read and check written stored data set for writing by the periodic transmission means 201.

Step 610 is a determination step carried out if the result of determination in step 605 is YES, and the receiving flag operates, and in step 610, it is determined whether the periodic report has been received from the second control circuit portion 200b or the report return corresponding to a reading request has been received. If it is the reception of the periodic report, the process proceeds to step 611, and if it is the reception of a report return, the process proceeds to step 612.

As indicated by the report information storing block 206d, in steps 611 and 612, reported information is written and stored in the RAM memory 116a at a prescribed address.

Step 613 is an operation terminating step carried out if the result of determination in step 608 is NO and there is no necessity for a reading request or subsequently to step 607, 609, 611, or 612, other kinds of control operation are carried out and then the process returns to the operation start step 600 in a circulating manner.

Now, the operation of the second control circuit portion 200b in FIG. 1 will be described in connection with FIG. 7.

Figure 7:
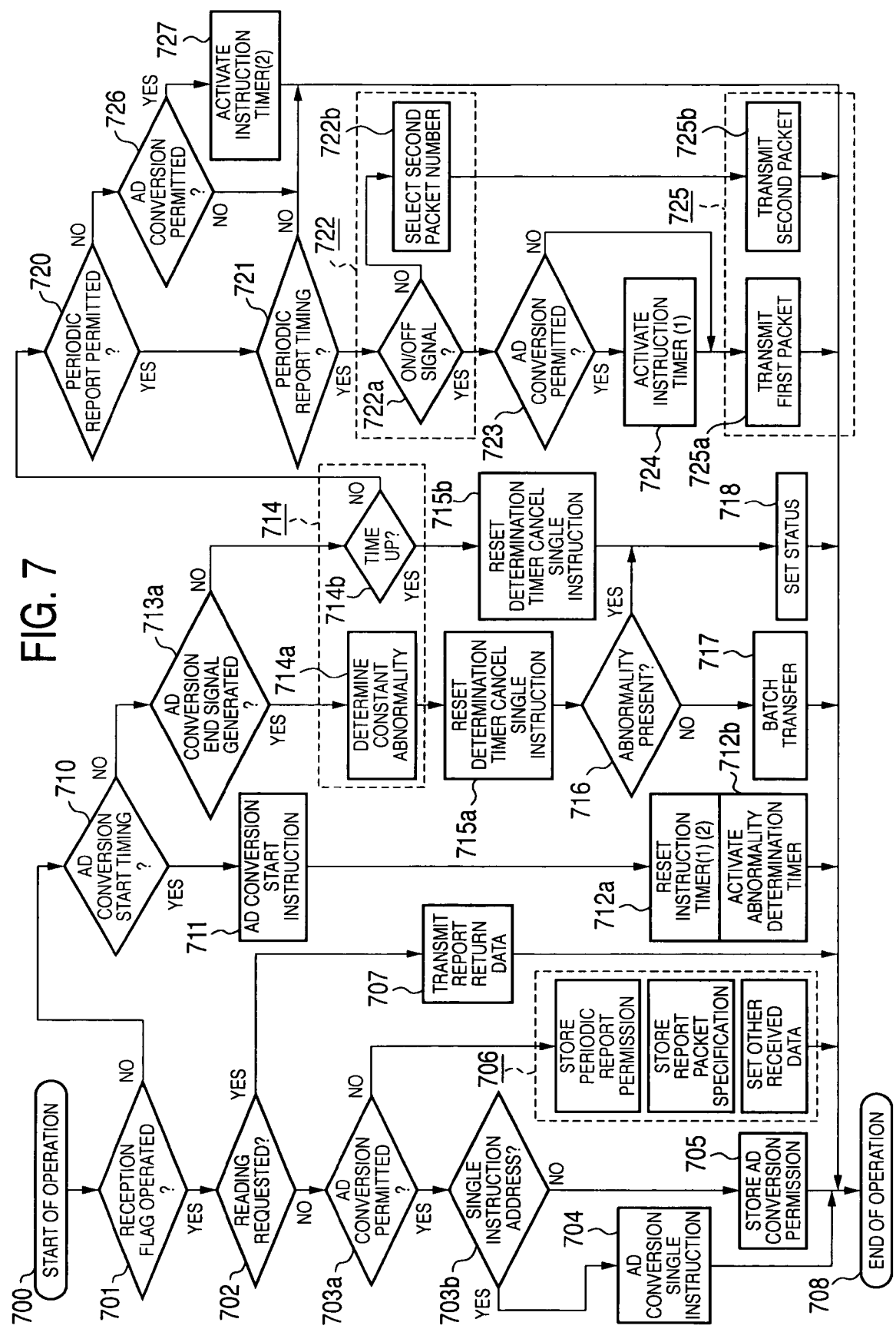
FIG. 7 is a flowchart for use in illustration of the operation of a second control circuit portion in the in-vehicle electronic control unit according to the first embodiment.

FIG. 7 is a flowchart for use in illustration of the operation of the second control circuit portion in the in-vehicle electronic control unit according to the first embodiment of the invention.

In FIG. 7, in step 700, the communication control circuit portion 120a starts the communication control operation, and in the subsequent step 701, the second serial-parallel converter 127 determines the operation state of the receiving flag that operates when the second serial-parallel converter 127 receives transmission data from the first serial-parallel converter 117. If the result of determination in step 701 has already been received, the process proceeds to step 702, and if the result is not yet received, the process proceeds to step 710.

In step 702, it is determined whether the received data is a reading request. If the result of determination in step 702 is not a reading request, the process proceeds to step 703a and if it is not, the process proceeds to step 707.

In step 703a, it is determined whether the received data is an AD conversion permission instruction. If the result of determination in step 703a is YES, the process proceeds to step 703b, and if the data is not an AD conversion permission instruction, the process proceeds to step block 706.

In step 703b, it is determined whether the received data determined as an AD conversion instruction is a continuous permission instruction or a single permission instruction based on whether the specified address is #01 or #02. If the result of determination in step 703b is a single instruction, the process proceeds to step 704, and if the process is a continuous instruction, the process proceeds to step 705.

Step 704 serves as AD conversion single instruction means and in step 704, instruction data "01H" is transmitted in a periodic transmission packet 211bb to address #02 in the data memory 126a. The second control circuit portion 200b generates an AD conversion start instruction ADen for one occasion to the multi-channel AD converter 204a, and replaces the data with instruction data "00H" in the following steps 715a and 715b.

In step 705, an AD conversion permission instruction is stored, and instruction data "01H" is transmitted in the periodic transmission packet 211bb to address #01 in the data memory 126a. The second control circuit portion 200b intermittently permits the multi-channel AD converter 204a to generate the AD conversion start instruction ADen and when the data is replaced by instruction data "00H," the AD conversion permission is cancelled.

Instep block 706, the received data is written and stored in the data memory 126a at an address specified based on whether the received data is periodic report permission in the periodic transmission packet 211aa, report packet specification in the periodic transmission packet 211cc or other data setting in the periodic transmission packet 201l.

In step 707, report returning is carried out by the report returning means 207b, and the second control circuit portion 200b transmits the report return packet 207bb including the monitoring input data or written stored data at a specified address as a check return in response to the reception of the non-periodic transmission packet by the second control circuit portion 200b.

Step 708 is an operation terminating step carried out if the result of determination is NO in steps 704 and 705, step block 706, step 707, or the following steps 721 and 726 or subsequently to step 712b, 717, 718, 725a, 725b, or 727 that will be described. After other kinds of control operation are carried out, the process again proceeds to the operation start step 700 in a circulating manner.

In step 710, it is determined whether it is timing for starting AD conversion. In step 710, immediately after receiving the AD conversion single instruction in step 704 or when an instruction timer 1 activated in the following step 724 is up, or an instruction timer 2 activated in the following step 727 is up, the determination result is YES, and the process proceeds to step 711. If it is not the timing for starting AD conversion, the process proceeds to step 713a.

In step 711, the AD conversion timing specifying means 205a generates an AD conversion start instruction ADen to the multi-channel AD converter 204a, and in the following step 712a, the instruction timers 1 and 2 activated in the following step 724 or 727 are reset. In the following step 712b, an abnormality determination timer is activated.

In step 713a, it is determined whether the multi-channel AD converter 204a has generated an AD conversion end signal ADfin, and if the end signal has been generated, the process proceeds to step 714a and if the end signal is not yet generated, the process proceeds to step 714b.

Step 714a serves as conversion constant abnormality determining means, and in step 714a, prescribed fixed voltage is applied for example to an input channel 0 in the multi-channel AD converter 204a, and abnormality is determined when a digital conversion value for the fixed voltage is out of a prescribed tolerance range.

Step 714b serves as over time determining means, and in step 714b, time required after the AD conversion start instruction ADen is supplied to the multi-channel AD converter 204a in step 711 till the multi-channel AD converter 204b generates an AD conversion end signal ADfin is measured by the determination timer activated in step 712b. If the measured time exceeds a prescribed value, the process proceeds to step 715b, and if it does not, the process proceeds to step 720.

Note that step block 714 serves as abnormality determining means 205b including steps 714a and 714b, and in step block 714, the multi-channel AD converter 204a is determined as having an abnormality when it is determined that the AD conversion value by the multi-channel AD converter 204a is out of the range of prescribed upper and lower limits or that the time required for AD conversion is not less than a prescribed value.

Steps 715a and 715b serve as single instruction canceling means, and in steps 715a and 715b, the abnormality determining timer activated in step 712b is reset, and if the AD conversion is based on the AD conversion single instruction set in step 704, the AD conversion single instruction is reset and the content of the data memory at address #02 is set as instruction data "00H."

Step 716 following step 715a is an abnormality determination step, and if the result of abnormality determination in step 714a indicates abnormality, the process proceeds to step 718, and if no abnormality is determined, the process proceeds to step 717.

In step 717, batch transfer by the batch transfer means 205c is carried out, and batch transfer is carried out from the first data memory 204b in which digital conversion values for analog inputs for all the channels sequentially converted by the multi-channel AD converter 204a are stored to the second data memory 203b in which the periodic report data to the first control circuit portion 200a is stored.

Step 718 serves as abnormality reporting means that carries out abnormality reporting when the result of determination in step 714b indicates over time or the result of determination in step 716 indicates an abnormality about constants. In step 718, status information 205d indicating abnormality is written in the data memory 126a at a prescribed address, and the status information 205b is periodically reported to the first control circuit portion 200a by the periodic report packet 206aa.

In step 720, it is determined whether or not periodic reporting is permitted. If periodic reporting is permitted, the process proceeds to step 721, and if it is not permitted, the process proceeds to step 726.

In step 721, it is determined whether it is timing for periodic reporting based on time elapsed immediately after permission of the periodic reporting or the previous periodic reporting. If it is the timing for periodic reporting, the process proceeds to step 722a, and if is it not, the process proceeds to the operation terminating step 708.

In step 722a, it is determined whether a periodic report packet 206aa related to ON/OFF input information is to be reported, and if the result of determination in step 722a is YES, the process proceeds to step 723, and if the result is NO, the process proceeds to step 722b.

In step 722b, among periodic report packets 206bb related to analog input information, a packet with which analog input number is to be reported is sequentially selected.

Step block 722 including steps 722a and 722b forms report sequence selecting means 206c, and in step block 722, the first report packet 206aa that reports a batch of ON/OFF information, and the second report packet 206bb that reports digital information for a prescribed number of channels that have been converted into digital information by the multi-channel AD converter 204a are sequentially selected. The first report packets 206aa are given priority in selection for periodic reporting so that at least the second report packets 206bb are not successive.

Instep block 722, one or more second report packets 206bb specified by the periodic transmission packet 211cc generated by the report packet specifying means 211c are sequentially selected to carry out periodic reporting. Analog input signals not specified by the periodic transmission packet 211c are excluded from the range of periodic reporting.

In step 723, it is determined whether AD conversion is permitted, and if the result of determination in step 723 is YES, the process proceeds to step 724, and if the AD conversion is not permitted, the process proceeds to step 725a.

In step 724, AD conversion timing is specified by the AD conversion timing specifying means 205a, and in step 724, the AD conversion instruction timer 1 is activated. As shown in the timing chart at (e) in FIG. 4, when the instruction timer 1 is up after a time delay Td, the determination in step 710 is YES, and an AD conversion start instruction ADen is generated in step 711.

In the following step 725a, the first report packet 206aa is transmitted by the periodic reporting means 206a, and the batch of ON/OFF input information is reported in the first report packet 206aa.

In step 725b following step 722b, the second report packet 206bb is transmitted by the periodic reporting means 206b and analog input information is reported in the second report packet 206bb. The channel number of the analog input to be reported is sequentially updated and selected in step 722b.

Step block 725 includes steps 725a and 725b and serves as periodic reporting means. Step block 725 serves as input reading means that periodically reports the monitoring input data and the status information to the first control circuit portion 200a from the second control circuit portion 200b and the first control circuit portion 200a stores the periodic report data in the RAM memory 116a.

Step 726 is carried out when periodic reporting is not permitted and it is determined in this step whether AD conversion is permitted. If the result of determination in step 726 is YES, the process proceeds to step 727, and if AD conversion is not permitted or subsequently to step 727, the process proceeds to the operation terminating step 708.

Step 727 serves as periodic AD conversion instruction means, and is carried out when periodic reporting is not permitted and AD conversion continues to be permitted. When the instruction timer 2 is activated and expired after a prescribed period, the result of determination in step 710 is YES, an AD conversion start instruction ADen is generated in step 711, and the instruction timer 2 is reset in the following step 712a.

When step 727 is again carried out after the instruction timer 2 is reset in step 712a, an AD conversion start instruction ADen is generated in the following step 711.

Note that the minimum value for time set for the instruction timer 1 activated in step 724 is zero, and the maximum value is not more than the periodic reporting cycle, while a sufficiently long period is set for the instruction timer 2 activated in step 727.

As can be seen from the foregoing, the in-vehicle electronic control unit according to the first embodiment of the invention includes, as the first control circuit portion 200a, a program memory 115a having input/output control means and communication control means, a RAM memory 116a for operation processing, a microprocessor 110a in corporation with the program memory 115a, and a first serial-parallel converter 117. The unit includes, as the second control circuit portion 200b, at least a communication control circuit 120a for communicating at least the monitoring signals and the control signals, a switch signal input circuit 122b, an analog signal input circuit 123b including a multi-channel AD converter 204a, a data memory 126a, and a second serial-parallel converter 127, so that the monitoring signals and the control signals can be serially exchanged between each other through the first and second serial-parallel converters 117 and 127. The first control circuit portion 200a further includes periodic transmission means 201, periodic report permission means 211a, and AD conversion permission means 211b. The second control circuit further includes periodic reporting means 206a and 206b, report sequence selecting means 206c, and AD conversion timing specifying means 205a.

The periodic transmission means 201 periodically transmits control output data and constant setting data from the first control circuit portion 200a to the second control circuit portion 200b. The second control circuit portion 200b has stored the control output data and the setting data in the data memory 126a.

The periodic report permission means 211a transmits instruction data to permit the second control circuit portion 200b to transmit the periodic report to a prescribed address portion of the data memory 126a provided in the second control circuit portion 200b by the periodic transmission means 201 and the second control circuit portion 200b has the data stored in the data memory 126a.

The AD conversion permission means 211b transmits instruction data used by the second control circuit portion 200b to permit the multi-channel AD converter 204a to generate an AD conversion start instruction ADen to a prescribed address portion of the data memory 126a provided in the second control portion 200b by the periodic transmission means 201, and the second control circuit portion 200b has the data stored in the data memory 126a.

The periodic reporting means 206a and 206b carry out periodic reporting about the monitoring input data and the status information to the first control circuit 200a from the second control circuit 200b, so that the first control circuit portion 200a has the periodic report data stored in the RAM memory 116a.

The report sequence selecting means 206c sequentially selects a first report packet 206aa for reporting a batch of a plurality of ON/OFF information input from the switch signal input circuit 122b, and the second report packet 206bb for reporting digital information for a prescribed number of channels converted into digital data by the multi-channel AD converter 204a, and periodic reporting is carried out by the periodic reporting means 206a and 206b so that the first report packet 206aa is given priority while at least second report packets 206bb are not successive.

The AD conversion timing specifying means 205a generates an AD conversion start instruction ADen to the multi-channel AD converter 204a after the second control circuit portion 200b receives instructions for periodic report permission and AD conversion permission by the periodic report permission means 211a and the AD conversion permission means 211b and immediately after or a prescribed period after the first report packet 206aa is transmitted, and specifies the AD conversion start timing so that a series of AD conversion operation by the multi-channel AD converter 204a is complete before the next second report packet 206bb is transmitted.

The first control circuit portion 200a further includes report packet specifying means 211c.

The report packet specifying means 211c transmits, to a prescribed address portion of the data memory 126a provided in the second control circuit portion 200b, instruction data to specify a report packet among the plurality of the second report packets 206bb transmitted by the second control circuit 200b using the periodic reporting means 206b to be reported, and the second control circuit portion 200b stores the data in the data memory 126a. The report sequence selecting means 206c sequentially selects one or more second report packets 206bb specified by the report packet specifying means 211c and the first report packet 206aa, and the periodic reporting means 206a and 206b carry out periodic reporting.

Therefore, the first report packet 206aa can be transmitted with the highest priority, and analog signal inputs that mildly change and do not have to be reported about at high frequency can be excluded from the range of reporting as desired, in other words, the frequency of reporting them is reduced, so that the load on the communication control can be reduced.

The second control circuit portion 200b further includes abnormality determining means 174, batch transfer means 717, and abnormality reporting means 718.

The abnormality determining means 714 determines that an AD conversion value by the multi-channel AD converter 204a is out of the range of the upper and lower limit values or that time required for AD conversion is not less than a prescribed value, and determines that the multi-channel AD converter 204a has an abnormality.

The batch transfer means 717 operates when no abnormality is determined by the abnormality determining means 714, and carries out batch transfer from the first data memory 204b that sequentially stores a plurality of digital values produced by the multi-channel AD converter 204a to the second data memory 203b that stores periodic report data to the first control circuit portion 200a.

The abnormality reporting means 718 operates when the an abnormality is determined by the abnormality determining means 714, writes status information 205d to a prescribed address portion of the data memory 126a, and carries out periodic reporting to the first control circuit portion 200a by adding the status information 205d to the first report packet 206aa.

In this way, after a series of AD conversion by the multi-channel AD converter 204a, normal data as collected is transferred to the second data memory 203b for report transmission as a batch, and therefore no erroneous data is transmitted for reporting.

When AD conversion is carried out again after an abnormality occurs, old data stored in the second data memory 203b can temporarily be transmitted for reporting, and normality recovery based on another AD conversion instruction can be waited for. Since the abnormality state is periodically reported, the AD conversion can be stopped by the first control circuit portion 200a when the abnormality continues.

The abnormality determining means 714 includes conversion constant abnormality determining means 714a that is provided with prescribed fixed voltage as one analog input signal inputted to the multi-channel AD converter 204a, and determines the abnormality when a digital conversion value to the fixed voltage is out of a prescribed tolerance range.

In this way, abnormalities in connection with the AD conversion accuracy by the multi-channel AD converter 204a or the accuracy of stabilizing control voltage can be determined.

The abnormality determining means 714 includes time over determining means 714b that measures required time from a timing that the supply of an AD conversion start instruction ADen to the multi-channel AD converter 204a to a timing that and the multi-channel AD converter generates an AD conversion end signal ADfin, and determines that the multi-channel AD converter 204a has the abnormality if the time exceed a prescribed value.

In this way, abnormalities in the conversion operation of the multi-channel AD converter 204a can be detected by the simple measuring means.

The first control circuit 200a further includes non-periodic transmission means 207a and the second control circuit portion 200b further includes report returning means 207b.

The non-periodic transmission means 207a is adapted as required to allow the first control circuit portion 200a to read and check the monitoring input data at a specified address to the second control circuit portion 200b and also to read and check written storage data written set for writing by the periodic transmission means 201.

The report returning means 207b returns a report for the monitoring input data or written storage data at the specified address as a return confirmation of the reception of the non-periodic transmission packet 207aa by the second control circuit portion 200b. If the monitoring input data to be returned by the report returning means 207b is a digital conversion value input from the analog signal input circuit, the second control circuit portion 200b supplies the multi-channel AD converter 204a with an AD conversion start instruction ADen in advance.

Therefore, based on analog signal inputs changing mildly at very low speed that do not need periodic reporting, the non-periodic transmission means can read out digital conversion values as the need arises.

The first control circuit 200a further includes AD conversion single instruction means 704, and the second control circuit portion 200b further includes single instruction canceling means 715a and 715b.

The AD conversion single instruction means 704 uses the periodic transmission means 201 to transmit data used by the second control circuit portion 200b to permit the multi-channel AD converter 204a to generate the AD conversion start instruction ADen for one occasion to a prescribed address portion the data memory 126a different from the address used by the AD conversion permission means 211b in the second control circuit portion 200b and the second control circuit portion 200b has the data stored in the data memory 126a.

The single instruction canceling means 715a and 715b cancel the AD conversion single instruction written in the data memory 126a by the second control circuit portion 200b when the multi-channel AD converter 204a ends AD conversion, and the first control circuit portion 200a transmits an AD conversion single instruction 704 using the periodic transmission means 201 and then carries out a reading request using the non-periodic transmission means 207a. In this way, the AD conversion is complete in the stage prior to returning the report.

Therefore, when the state of a particular analog signal input is desired to be monitored for a moment with no AD conversion permission, an AD conversion start instruction can be generated in advance in the timing shown at (b) in FIG. 5 using the simple means.

The second control circuit portion 200b further includes periodic conversion instruction means 727 that operates when periodic reporting is not permitted by the periodic report permission means 211a and AD conversion is permitted by the AD conversion permission means 211b and generates an AD conversion start instruction ADen to the multi-channel AD converter 204a at prescribed time intervals.

In this way, when no periodic reporting is carried out, AD conversion is carried out at prescribed time intervals, so that relatively new AD conversion data can easily be obtained by issuing a reading request as the need arises.

According to the first embodiment, periodic reporting is prohibited at the start of operation, and various kinds of constant setting are carried out intensively by the periodic transmission means. Once initialization is complete, periodic reporting is permitted so that input monitoring by periodic reporting and output control by periodic reporting are carried out to each other. The microprocessor provided in the first control circuit portion can permit or stop AD conversion by the multi-channel AD converter provided in the second control circuit portion.

The second control circuit portion can generate an AD conversion start instruction in synchronization with a first report packet when AD conversion is permitted. Therefore, immediately before a second report packet including a digital conversion value for an analog signal as transmission data is transmitted, AD conversion is complete, and up-to-date AD conversion information can be reported.

If periodic reporting is permitted, AD conversion can be carried out/stopped in order to keep AD conversion more frequent than necessary from being carried out, and the control load on the second control circuit portion can be alleviated.

The first control circuit portion can periodically request monitoring input data to be transmitted using a non-periodic transmission packet.

Second Embodiment

Now, a second embodiment of the invention will be described mainly about the difference from the first embodiment.

Figure 8:
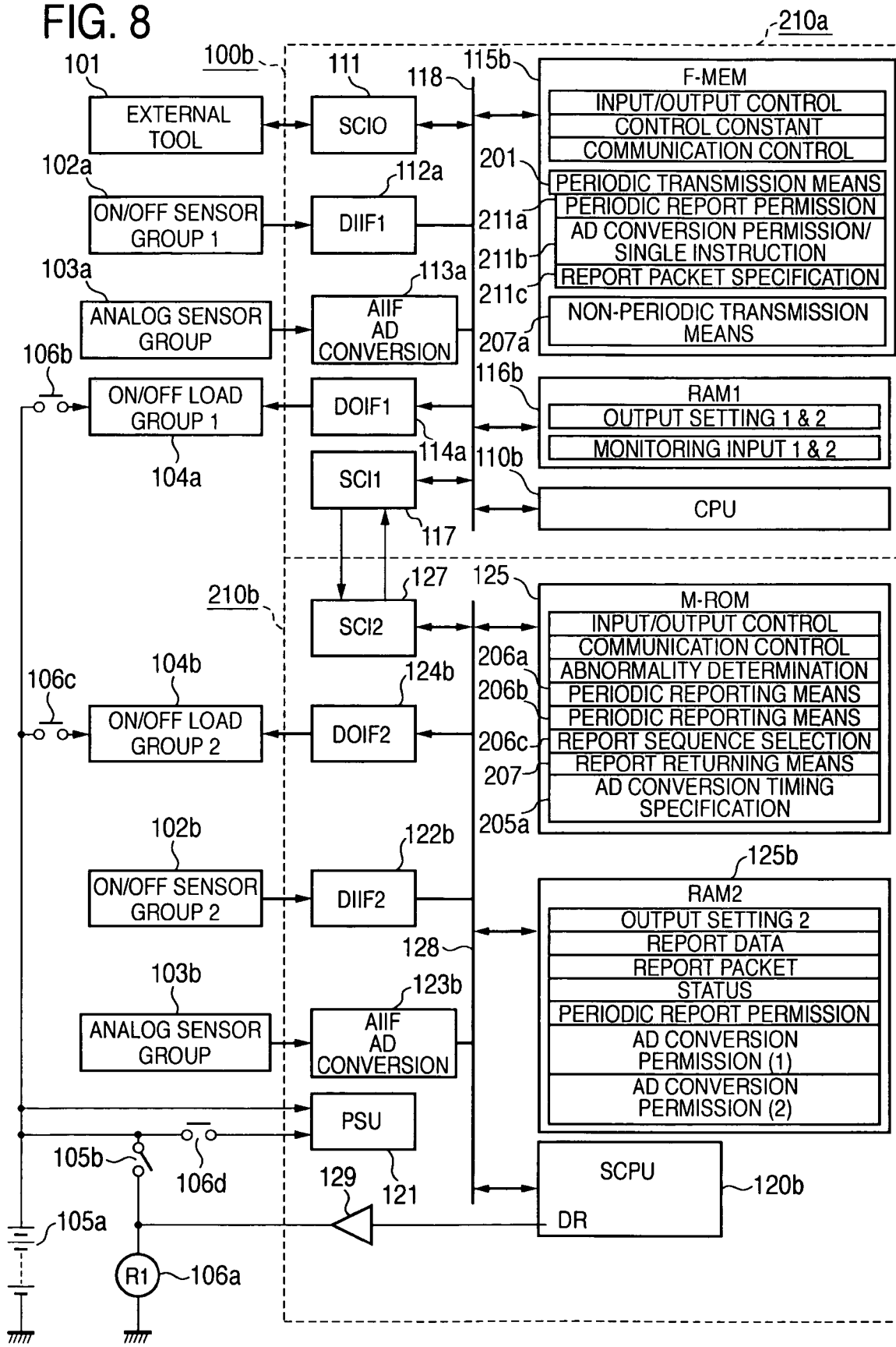
FIG. 8 is a block diagram of the configuration of the in-vehicle electronic control unit according to the second embodiment of the invention.

FIG. 8 is a block diagram of the configuration of the in-vehicle electronic control unit according to the second embodiment of the invention.

In FIG. 8, the in-vehicle electronic control unit 100b includes a first control circuit portion 210a and a second control circuit portion 210b, and the part other than the second control circuit portion 210b is the same as that in FIG. 1. The elements 121, 122b, 123b, 124b, 127, 128 and 129 included in the second control circuit portion 210b in FIG. 8 are the same as those in FIG. 1. The second control circuit 210b in FIG. 8 has an auxiliary CPU 120b (microprocessor), an auxiliary program memory 125 and an auxiliary RAM memory 126b. The auxiliary program memory 125 stores AD conversion timing specifying means 205a, periodic reporting means 206a and 206b, report sequence selecting means 206c, and report returning means 207.

Note that the communication control circuit portion 120a in FIG. 1 is made of an integrated circuit device using a logic circuit, while the structure in FIG. 8 is essentially different in that it includes the auxiliary CPU 120b, and that simple input/output control means is additionally provided in the second control circuit portion 210b.

A microprocessor as a main CPU 110b, the main element of the first control circuit portion 210a cooperates with a non-volatile program memory 115b such as a flash memory storing a control program and control constants and a RAM memory 116b for operation processing.

The microprocessor as the auxiliary CPU 120b, the main element of the second control circuit portion 210b cooperates with the auxiliary program memory 125 such as a mask ROM memory that stores a program serving as input/output control means in the second control circuit portion 210b or a communication program.

The auxiliary RAM memory 126b in cooperation with the auxiliary CPU 120b includes a data memory in the structure shown in FIG. 1.

Now, the operation will be described.

As described above, according to the second embodiment, the second control circuit portion 210b includes the auxiliary CPU 120b in cooperation with the auxiliary program memory 125 and the auxiliary RAM memory 126b for operation processing.

The auxiliary CPU 120b is stored in the second control circuit portion 210b together with an indirect input signal interface circuit 122b serving as a switch signal input circuit, an analog signal input circuit 123b including a multi-channel AD converter 204a, an indirect output signal interface circuit 124b, and a second serial-parallel converter 127.

The auxiliary CPU 120b transmits an indirect input signal related to a signal input through the switch signal input circuit 122b and the analog signal input circuit 123b to the first control circuit portion 210a through the second and first serial-parallel converters 127 and 117, and drives a second electric load group 104b connected to the output circuit (the indirect output signal interface circuit) 124b with an output related to an indirect output signal received through the first and second serial-parallel converters 127 and 117 from the first control circuit portion 210a.

As the data memory, a region of the auxiliary RAM memory 126b is used.

In this way, the second control circuit portion 210b carries out logical coupling between a number of switch signal inputs and transmits minimum necessary one to the first control circuit portion 210a or drives the second electric load group 104b by applying interlock control logic to the control signal from the first control circuit portion 210a. In other words, the second control circuit portion shares a part of the input/output control function, improves the control performance as a whole or changes the content of the auxiliary program memory 125, and thus can change the control content in a simple manner.

According to the second embodiment, the same advantages as those according to the first embodiment can be provided, and the second control circuit portion shares a part of the input/output control function, so that the control performance as a whole is improved. The content of the auxiliary program memory can be changed so that the control content can easily be changed.

What is claimed is:

1. An in-vehicle electronic control unit, comprising a first control circuit portion and a second control circuit portion,
said first control circuit portion comprising:
a program memory having input/output control means and communication control means;
a RAM memory for operation processing;
a microprocessor in cooperation with the program memory; and
a first serial-parallel converter,
said second control circuit portion comprising:
a communication control circuit portion for communicating at least monitoring signals and control signals;
a switch signal input circuit;
an analog signal input circuit including a multi-channel AD converter;
a data memory; and
a second serial-parallel converter,
the first and second control circuit portions serially communicating the monitoring signals and the control signals with each other through the first and second serial-parallel converters,
the first control circuit portion further comprising periodic transmission means, periodic report permission means, and AD conversion permission means,
the periodic transmission means serving as writing setting means for periodically transmitting control output data and constant setting data from the first control circuit portion to the second control circuit portion and storing the control output data and the constant setting data in the data memory in the second control circuit portion,
the periodic report permission means serving as writing setting means for storing first instruction data to permit the second control circuit portion to transmit the periodic report, said first instruction data being transmitted by the periodic transmission means to a prescribed address portion of the data memory provided in the second control circuit portion,
the AD conversion permission means serving as writing setting means for storing second instruction data to permit the second control circuit portion to issue an AD conversion start instruction to the multi-channel AD converter, said second instruction data being transmitted by the periodic transmission means to a prescribed address portion of the data memory in the second control circuit portion,
the second control circuit portion further comprising periodic reporting means, report sequence selecting means, and AD conversion timing specifying means,
the periodic reporting means serving as input reading means used for periodically reporting periodic report data including monitoring input data and status information from the second control circuit portion to the first control circuit portion and used for allowing the first control circuit portion to store the periodic report data in the RAM memory,
the report sequence selecting means serving as selecting control means for sequentially selecting a first report packet that reports a batch of a plurality of ON/OFF information inputted from the switch signal input circuit, and a second report packet that reports digital information for a prescribed number of channels produced by digital conversion by the multi-channel AD converter, and carrying out periodic reporting by the periodic reporting means so that the first report packet is given priority and at least the second report packets are not successive,
the AD conversion timing specifying means serving as conversion control means for generating the AD conversion start instruction to the multi-channel AD converter after the second control circuit portion receives instructions for periodic report permission and AD conversion permission by the periodic report permission means and the AD conversion permission means and after the first report packet is transmitted, and specifying AD conversion start timing so that a series of AD conversion operation by the multi-channel AD converter is complete before the timing of transmitting the next second report packet.

2. The in-vehicle electronic control unit according to claim 1, wherein
the first control circuit portion further comprises report packet specifying means,
the report packet specifying means serves as writing setting means for storing third instruction data to specify a report packet to be reported among a plurality of the second report packets transmitted by the second control circuit portion using the periodic transmission means to a prescribed address portion of the data memory in the second control circuit portion and to be transmitted by the second control circuit portion using the periodic transmission means, and
the report sequence selecting means sequentially selects at least one of the second report packets specified by the report packet specifying means and the first report packet and carrying out periodic reporting by the periodic reporting means.

3. The in-vehicle electronic control unit according to claim 1, wherein
the second control circuit portion further comprises abnormality determining means, batch transfer means, and abnormality reporting means,
the abnormality determining means detects that an AD conversion value by the multi-channel AD converter is out of the range of prescribed upper and lower limits, and determines that the multi-channel AD converter has an abnormality,
the batch transfer means operates when the determination by the abnormality determining means indicates no abnormality, and carries out batch transfer from a first data memory that sequentially stores a plurality of digital conversion values by the multi-channel AD converter to a second data memory that stores periodic report data to the first control circuit portion, and the abnormality reporting means operates when the result of determination by the abnormality determining means indicates abnormality, writes the status information to a prescribed address portion of the data memory, adds the status information to the first report packet, and carries out periodic reporting to the first control circuit portion.

4. The in-vehicle electronic control unit according to claim 3, wherein the abnormality determining means comprises conversion constant abnormality determining means, the conversion constant abnormality determining means is provided with prescribed fixed voltage as one analog input signal inputted to the multi-channel AD converter, and determines the abnormality when a digital conversion value to the fixed voltage is out of a prescribed tolerance range.

5. The in-vehicle electronic control unit according to claim 1, wherein the second control circuit portion further comprises abnormality determining means, batch transfer means, and abnormality reporting means, the abnormality determining means detects that time required for AD conversion is at least a prescribed value, and determines that the multi-channel AD converter has an abnormality, the batch transfer means operates when the determination by the abnormality determining means indicates no abnormality, and carries out batch transfer from a first data memory that sequentially stores a plurality of digital conversion values by the multi-channel AD converter to a second data memory that stores periodic report data to the first control circuit portion, and the abnormality reporting means operates when the result of determination by the abnormality determining means indicates abnormality, writes the status information to a prescribed address portion of the data memory, adds the status information to the first report packet, and carries out periodic reporting to the first control circuit portion.

6. The in-vehicle electronic control unit according to claim 4, wherein the abnormality determining means comprises over time determining means, and the over time determining means measures required time from a timing that the AD conversion start instruction is supplied to the multi-channel AD converter to a timing that the multi-channel AD converter generates an AD conversion end signal, and determines that the multi-channel AD converter has the abnormality if the required time exceeds a prescribed value.

7. The in-vehicle electronic control unit according to claim 1, wherein the first control circuit portion further comprises non-periodic transmission means, the second control circuit portion further comprises report returning means, the non-periodic transmission means is reading request means adapted as required to allow the first control circuit portion to read and check the monitoring input data at a specified address to the second control circuit portion, the report returning means carries out report returning for the monitoring input data at a specified address as checking return in response to the reception of the non-periodic transmission data by the second control circuit portion, and when the monitoring input data returned as a report from the report returning means is a digital conversion value input from the analog signal input circuit, the second control circuit portion has supplied the AD conversion start instruction to the multi-channel AD converter in advance.

8. The in-vehicle electronic control unit according to claim 7, wherein the first control circuit portion further comprises AD conversion single instruction means, the second control circuit portion further comprises single instruction canceling means, the AD conversion single instruction means serves as writing setting means for permitting the second control circuit portion to generate the AD conversion start instruction for a single conversion occasion to the multi-channel AD converter, the AD conversion start instruction being transmitted by the periodic transmission means to a prescribed address of the data memory provided in the second control circuit portion different from the address used by the AD conversion permission means, the single instruction canceling means cancels an AD conversion single instruction written in the data memory by the second control circuit portion when the multi-channel AD converter finishes AD conversion, and the first control circuit portion transmits an AD conversion single instruction by the periodic transmission means in advance and then requests for reading by the non-periodic transmission means, so that AD conversion is complete in a stage prior to report returning.

9. The in-vehicle electronic control unit according to claim 7, wherein the second control circuit portion further comprises periodic AD conversion instruction means, and the periodic AD conversion instruction means operates when periodic reporting is not permitted by the periodic report permission means, and AD conversion is permitted by the AD conversion permission means, and issues the AD conversion start instruction to the multi-channel AD converter at prescribed time intervals.

10. The in-vehicle electronic control unit according to claim 1, wherein the first control circuit portion further comprises non-periodic transmission means, the second control circuit portion further comprises report returning means, the non-periodic transmission means is reading request means adapted as required to read and check written storage data set for writing by the periodic transmission means, the report returning means carries out report returning for the written storage data at a specified address as checking return in response to the reception of the non-periodic transmission data by the second control circuit portion, and when the monitoring input data returned as a report from the report returning means is a digital conversion value input from the analog signal input circuit, the second control circuit portion has supplied the AD conversion start instruction to the multi-channel AD converter in advance.

11. The in-vehicle electronic control unit according to claim 1, wherein the second control circuit portion further comprises an auxiliary CPU in cooperation with an auxiliary program memory and an auxiliary RAM memory for operation processing, the auxiliary CPU is a microprocessor included in the second control circuit portion together with an indirect input signal interface circuit serving as the switch signal input circuit, the analog signal input circuit including the multi-channel AD converter, an indirect output signal interface circuit, and a second serial-parallel converter, the auxiliary CPU transmits an indirect input signal related to a signal input through the switch signal input circuit and the analog signal input circuit to the first control circuit portion through the second and first serial-parallel converters, the auxiliary CPU drives a second electric load group connected to the indirect output signal interface circuit with an output related to the indirect output signal received through the first and second serial-parallel converters from the first control circuit portion, and a part of region of the auxiliary RAM memory is used as the data memory.

\* \* \* \* \*